(12) United States Patent
Bailie et al.

(10) Patent No.: US 8,191,193 B2
(45) Date of Patent: Jun. 5, 2012

(54) EXTENSION SECTION FOR RAMP PLATFORM

(75) Inventors: David A. Bailie, Kent, WA (US); Mark S. Celich, Auburn, WA (US)

(73) Assignee: Homecare Products, Inc., Algona, WA (US)

( * ) Notice: Subject to any disclaimer, the term of this patent is extended or adjusted under 35 U.S.C. 154(b) by 0 days.

(21) Appl. No.: 13/118,306

(22) Filed: May 27, 2011

(65) Prior Publication Data
US 2011/0225743 A1 Sep. 22, 2011

Related U.S. Application Data

(62) Division of application No. 11/697,648, filed on Apr. 6, 2007, now Pat. No. 7,950,094.

(60) Provisional application No. 60/789,658, filed on Apr. 6, 2006.

(51) Int. Cl.
 *E01D 1/00* (2006.01)
(52) U.S. Cl. .......................................... 14/69.5
(58) Field of Classification Search ............... 14/69.5; 404/40; 119/847, 849
See application file for complete search history.

(56) References Cited

U.S. PATENT DOCUMENTS

| | | | | |
|---|---|---|---|---|
| 1,966,402 | A * | 7/1934 | Barringer | 52/181 |
| 3,423,780 | A * | 1/1969 | Alten | 14/69.5 |
| 3,984,891 | A | 10/1976 | Weinmann | |
| 4,528,711 | A | 7/1985 | Packer | |
| 4,727,612 | A * | 3/1988 | Smith | 14/69.5 |
| 5,170,976 | A | 12/1992 | Lundman | 248/300 |
| 5,446,937 | A * | 9/1995 | Haskins | 14/69.5 |
| 5,538,308 | A * | 7/1996 | Floe | 296/61 |
| 5,608,937 | A * | 3/1997 | Seigneur et al. | 14/69.5 |
| 5,645,394 | A | 7/1997 | Hays | |
| 5,768,733 | A * | 6/1998 | Kneebone | 14/69.5 |
| 5,836,028 | A | 11/1998 | Petersen | |
| 5,903,943 | A * | 5/1999 | Sherrod | 14/2.4 |
| 6,430,769 | B1 | 8/2002 | Allen | |
| 6,575,516 | B2 * | 6/2003 | Webber | 296/61 |
| 6,701,563 | B2 * | 3/2004 | Schomaker et al. | 14/69.5 |
| 6,736,279 | B2 | 5/2004 | Allen | |
| 7,082,637 | B1 | 8/2006 | Griffin | |
| 7,100,231 | B2 | 9/2006 | Peschmann | |
| 7,237,294 | B2 | 7/2007 | Lensing | |
| 7,526,826 | B2 | 5/2009 | Bailie | |
| 7,950,094 | B2 * | 5/2011 | Bailie et al. | 14/69.5 |

OTHER PUBLICATIONS

Office Action mailed Feb. 22, 2010, from U.S. Appl. No. 11/697,648, filed Apr. 6, 2007, 9 pages.
Amendment After Non-Final Rejection dated May 24, 2010, in response to Office Action mailed Feb. 22, 2010, from U.S. Appl. No. 11/697,648, filed Apr. 6, 2007, 9 pages.
Final Office Action mailed Jul. 14, 2010, from U.S. Appl. No. 11/697,648, filed Apr. 5, 2007, 5 pages. Amendment Submitted With RCE dated Dec. 14, 2010, in response to Final Office Action mailed Jul. 14, 2010, from U.S. Appl. No. 11/697,648, filed Apr. 5, 2007, 7 pages.
Notice of Allowance and Fee(s) Due mailed Jan. 25, 2011, from U.S. Appl. No. 11/697,648, filed Apr. 5, 2007, 4 pages.

* cited by examiner

*Primary Examiner* — Gary S Hartmann
(74) *Attorney, Agent, or Firm* — Christensen O'Connor Johnson Kindness PLLC

(57) ABSTRACT

An extension section for a ramp platform generally includes a first sloping portion including a lip releasably that is receivable by a lip receiving channel, wherein the first sloping portion includes a stepped surface configured to interface with a transition plate, and a second sloping portion oriented with respect to the first sloping section such that the first and second sloping portions converge to form an obtuse angle at their juncture.

4 Claims, 7 Drawing Sheets

EXTENSION SECTION FOR RAMP PLATFORM

CROSS-REFERENCES TO RELATED APPLICATIONS

This application is a division of application Ser. No. 11/697,648, filed Apr. 6, 2007, now U.S. Pat. No. 7,593,785, to issue on May 31, 2011, which claims the benefit of Provisional Application No. 60/789,658, filed Apr. 6, 2006, the disclosures of which are hereby expressly incorporated by reference herein.

BACKGROUND

Portable ramp assemblies provide a portable inclined surface on which a user can travel between a lower and an upper elevation, for example, for access over a set of stairs or into a vehicle. Such ramp assemblies include a ramp platform and may include one or more transition plates for providing transition surfaces or resting contacts from a surface of a lower elevation to the ramp platform and from the ramp platform to a surface of an upper elevation.

In some cases, the transition plates are ill-suited or incompatible with the upper and/or lower elevation surfaces, for example, when the upper elevation surface includes a lip or a door jam (see FIG. 7). Hence, there exists a need for an improved portable ramp having improved transition plates and/or extension sections.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a ramp assembly is provided. The ramp assembly includes a ramp platform having a top substantially planar tread surface and an extension section extending outwardly from an end of the ramp platform. The extension section has proximal and distal sloping portions that converge at a juncture forming an obtuse angle therebetween.

In accordance with another embodiment of the present disclosure, a ramp assembly is provided. The ramp assembly includes a ramp platform having a top substantially planar tread surface. The ramp assembly further includes an extension section extending outwardly from an end of the ramp platform. The extension section includes a proximal sloping portion having a tread surface that slopes upwardly with respect to the end of the ramp platform, a distal sloping portion having a tread surface that slopes relative to the slope of the tread surface of the proximal sloping portion, and a crest at the convergence of the tread surfaces of the proximal and distal sloping portions.

In accordance with another embodiment of the present disclosure, an extension section for a ramp platform is provided. The extension section includes a first sloping portion including a lip releasably receivable by a lip-receiving channel in a ramp platform. The extension section further includes a second sloping portion oriented with respect to the first sloping section such that the first and second sloping portions converge to form an obtuse angle at their juncture. The extension section includes a fastening device for releasably fastening the extension section to the ramp platform.

In accordance with yet another embodiment of the present disclosure, an extension section for a ramp platform having a top substantially planar treat surface, a transition plate extending from the end of the ramp platform, and a lip receiving channel is provided. The extension section includes a first sloping portion including a lip releasably that is receivable by a lip receiving channel, wherein the first sloping portion includes a stepped surface configured to interface with a transition plate. The extension section further includes a second sloping portion oriented with respect to the first sloping section such that the first and second sloping portions converge to form an obtuse angle at their juncture.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 7:
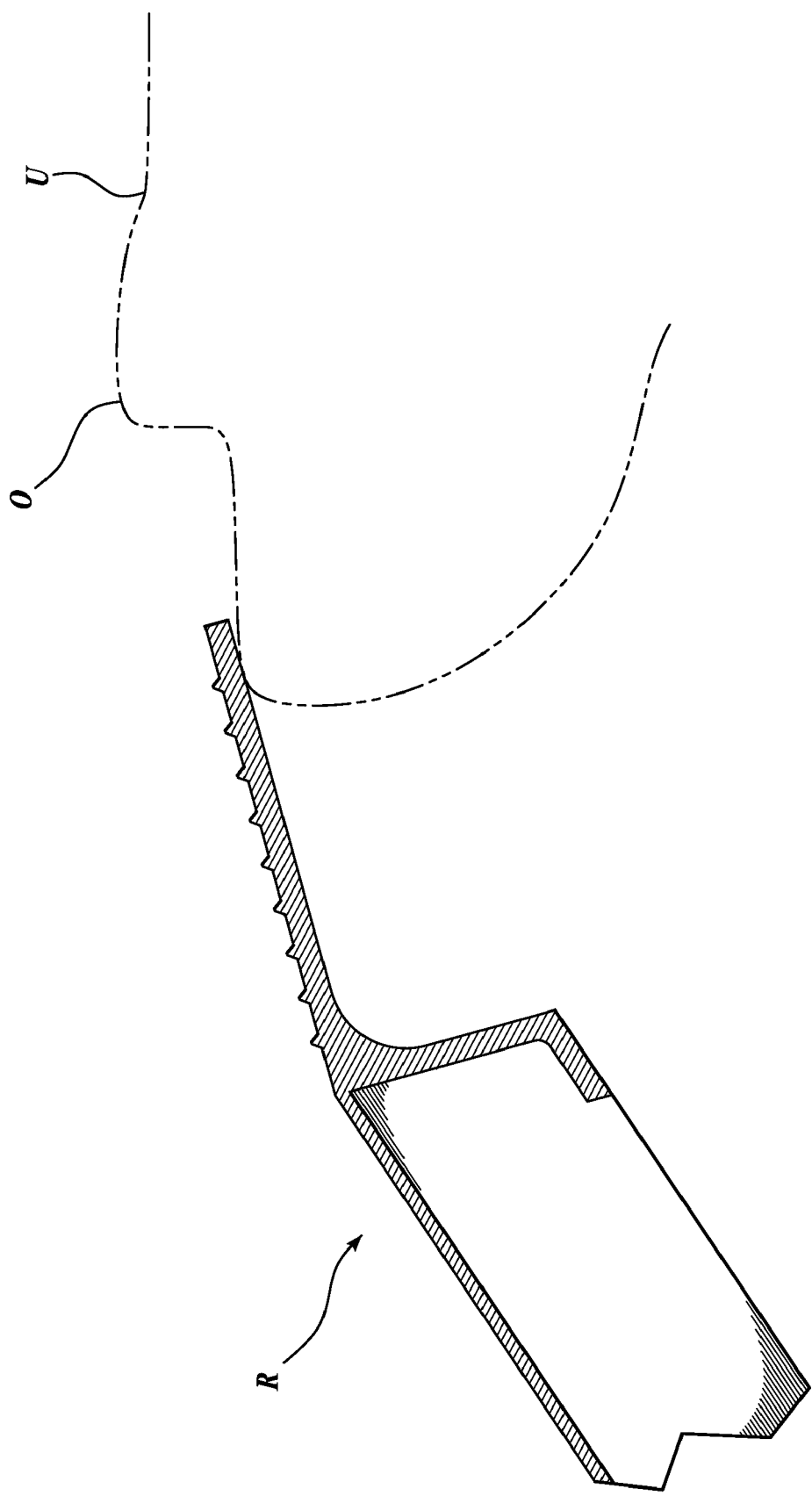
FIG. 7 is a partial cross-sectional side view of a conventional ramp assembly.

Embodiments of the present disclosure are generally directed to ramp assemblies having extension sections. Referring to FIGS. 1-4, a ramp assembly 20 constructed in accordance with the one embodiment of the present disclosure is shown. The ramp assembly 20 generally includes at least one ramp platform 22 and at least one extension section 24. In use, the extension section 24 of the ramp assembly 20 aids in overcoming a lip, door jam, molding, or other obstruction O (see FIG. 3) that may affect the resting contacts and/or the transition between the ramp platform 22 and a lower or upper elevation surface L or U, as compared to a ramp assembly R, which does not have such an extension section (see FIG. 7).

Figure 1:
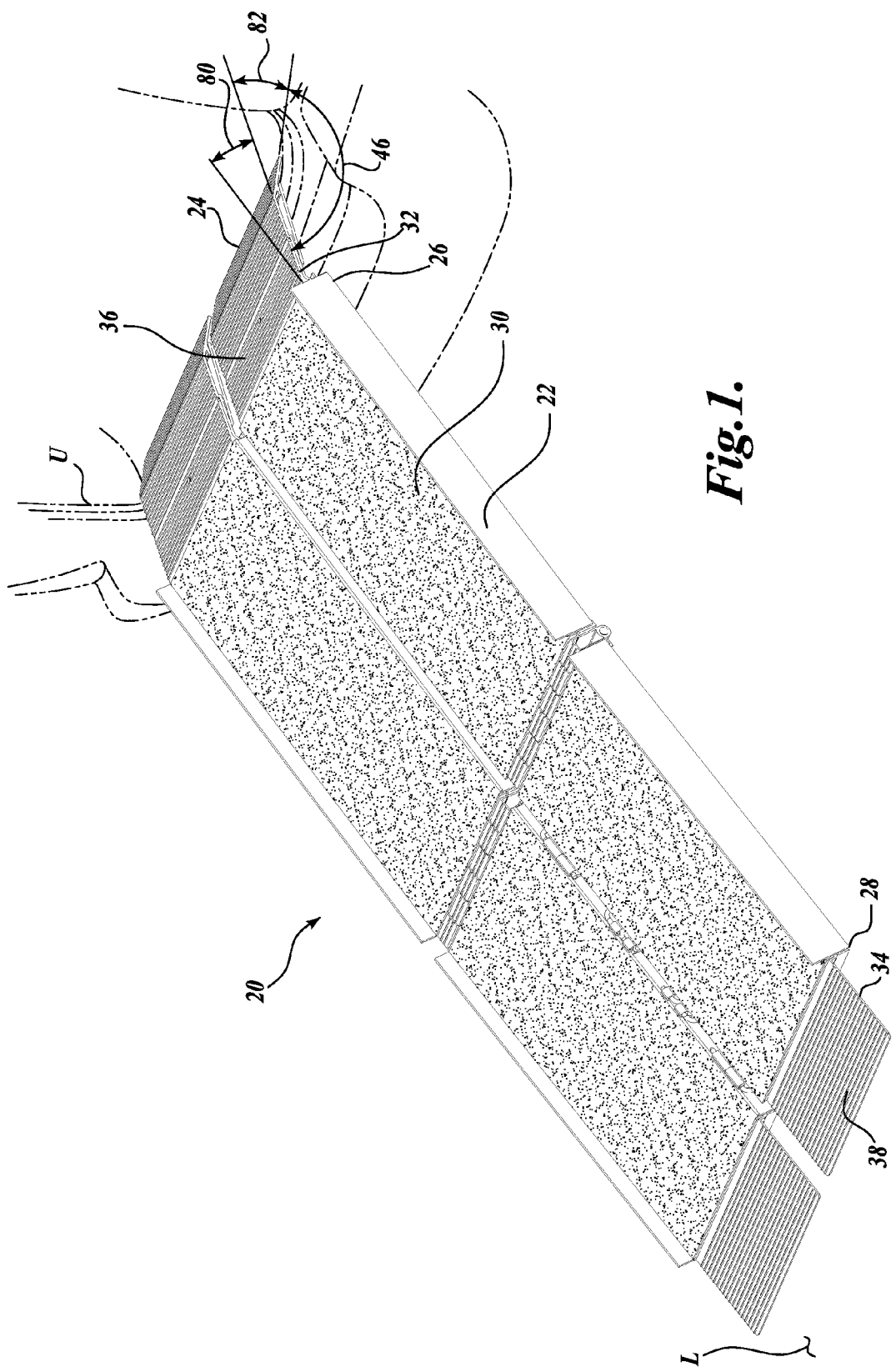
FIG. 1 is a perspective view of an exemplary embodiment of a ramp assembly having an extension section formed according to various aspects of the present disclosure.
Figure 2:
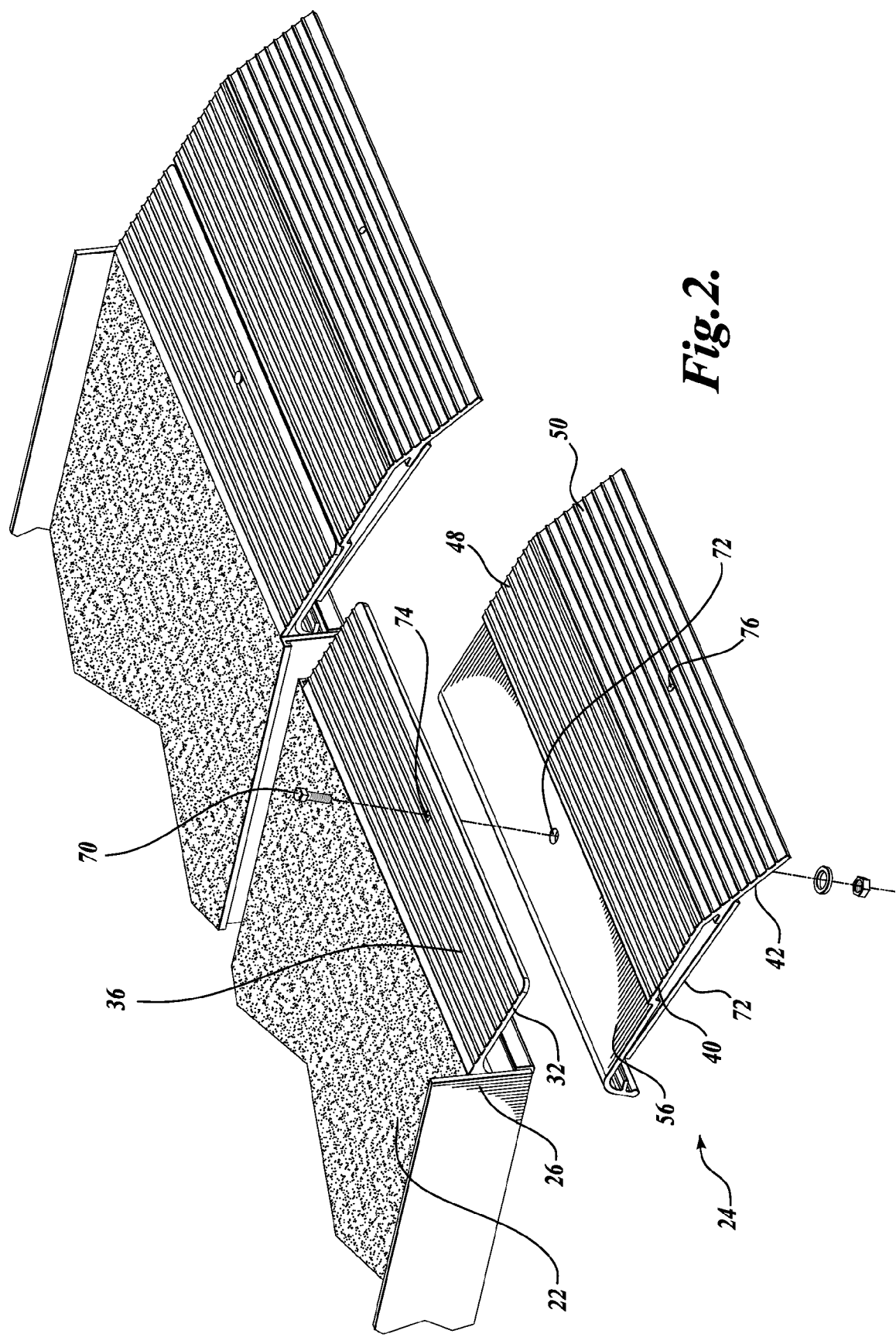
FIG. 2 is a partial exploded view of the ramp assembly and the extension section of FIG. 1.

Turning now to FIG. 1, the ramp platform 22 defines first and second ends 26 and 28 and includes a top substantially planar tread surface 30. In the embodiment shown in FIG. 1, the ramp platform 22 is of the foldable type and, as such, comprises a plurality of platform segments interconnected via hinge assemblies. For a more detailed description of one type of foldable ramp platform that may be utilized by embodiments of the ramp assembly 20, please see co-pending U.S. patent application Ser. No. 11/517,863, filed on Sep. 6, 2006, the disclosure of which is hereby incorporated by reference. However, it should be appreciated that other folding and non-folding ramp platforms having one or more ramp platform sections are also within the scope of the present disclosure.

Figure 3:
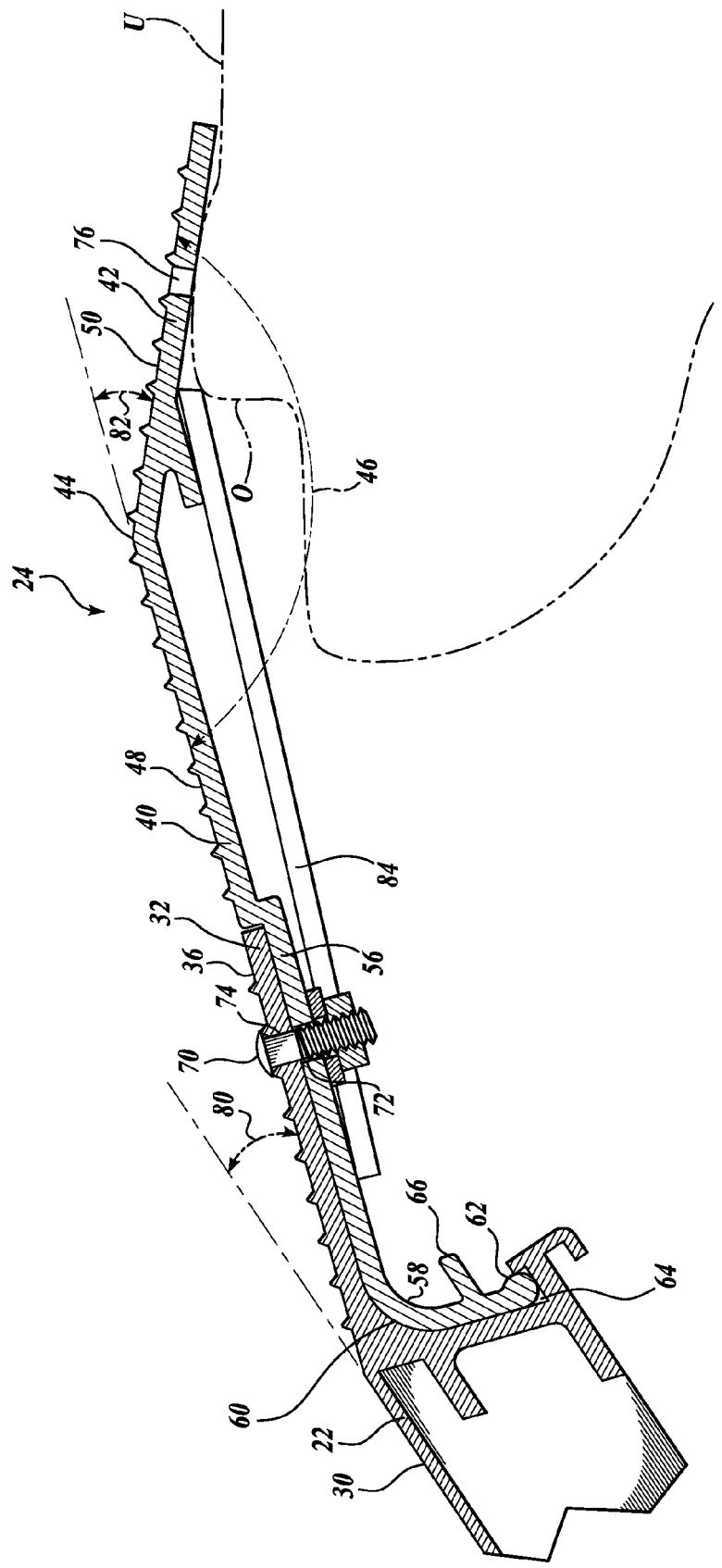
FIG. 3 is a partial cross-sectional side view of the extension section of the ramp assembly of FIG. 1.
Figure 4:
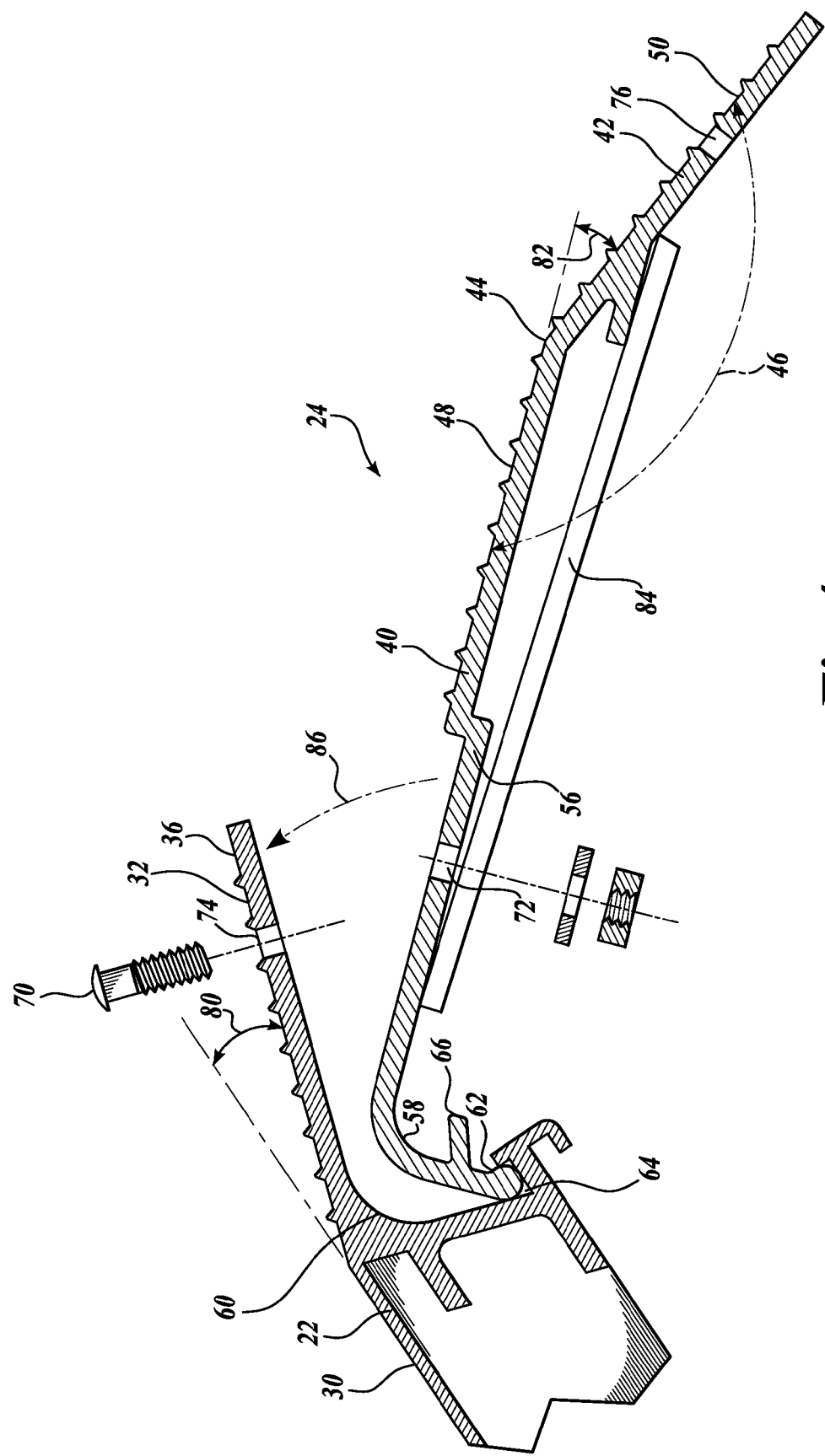
FIG. 4 is a partial cross-sectional side view of the extension section of the ramp assembly of FIG. 1 in the process of being coupled to the ramp assembly.

As seen in FIGS. 1-4, the ramp platform 22 may further include first and second transition plates 32 and 34 defining top substantially planar tread surfaces 36 and 38, respectively. The transition plates 32 and 34 are coupled to, or formed integrally with, and extend outwardly from the first and second ends 26 and 28 of the ramp platform 22. These transition plates 32 and 34 provide transition surfaces or resting contacts, for example, from a surface of the lower elevation L to the ramp platform 22 and from the ramp platform 22 to a surface of the upper elevation U when the ramp platform is in use. It should be appreciated that the tread surfaces 36 and 38 of these transition plates 32 and 34 may extend from the ramp platform 22 having the same angular orientation as the top substantially planar tread surface 30 of the ramp platform 22 or having different angular orientations. It should further be appreciated that the transitions plates 32 and 34 may provide an area of attachment on the ramp platform 22 for the extension section 24. For example, as seen in FIGS. 3 and 4, the extension section 24 extends from a transition plate 32 coupled to the ramp platform 22.

Referring again to FIGS. 1-4, the extension section 24 will now be described in greater detail. The extension section 24 includes proximal and distal sloping portions 40 and 42, which converge at a juncture 44 forming an obtuse angle 46 therebetween (see FIG. 3). Similar to the ramp platform 22 and the transition plates 32 and 34, the sloping portions 40 and 42 both may have substantially planar tread surfaces 48 and 50, respectively. It should be appreciated, however, that the sloping portions 40 and 42 need not be substantially planar and may have curved, curvilinear, arcuate, or other geometrical tread surfaces, as described in greater detail below with respect to FIG. 6. When coupled to the ramp assembly 20, the extension section 24 preferably interfaces with the first transition plate 32 so as to provide a continuous, non-stepped transition surface between the tread surface 36 of the first transition plate 32 and the tread surface 48 of the proximal sloping portion 40.

To aid in the attachment of the extension section 24 and the ramp platform 22, the proximal sloping portion 40 may include a stepped surface 56 that receives and interfaces with the first transition plate 32. Additionally, the proximal sloping portion 40 may include an appropriate interface, such as a rounded outer corner 58 that cooperatively interfaces with cooperating structure, such as a rounded underside 60, of the first transition plate 32. In addition, the proximal sloping portion 40 may also include a lip 62 extending along a peripheral edge of the proximal sloping portion 40. When the extension section 24 is attached to the ramp platform 22, the lip 62 is releasably received by a lip receiving channel 64 formed at the first end 26 of the ramp platform 22.

In the illustrated embodiment, adjacent the lip 62, the proximal sloping portion 40 may further include a lip alignment device 66 disposed for aiding in aligning the lip 62 with the lip receiving channel 64 when coupling the extension section 24 to the ramp assembly 20. In that regard, in the embodiment shown the lip alignment device 66 is an elongated protrusion extending along the underside of the proximal sloping portion 40 between the lip 62 and the rounded corner 58. When attaching the extension section 24 to the ramp assembly 20, the lip alignment device 66 can be used to make contact with the outer wall of the lip receiving channel 64 to guide the lip 62 into the lip receiving channel 64.

The extension section 24 may be attached to the ramp platform 22 via any one of numerous techniques. For example, the ramp assembly 20 in the illustrated embodiment further includes a removable fastening or coupling device 70 for fastening the extension section 24 to the first transition plate 32. In the illustrated embodiment, the fastening device 70 includes a nut and bolt fastener. In that regard, the proximal sloping portion 40 includes a first hole 72, and the first transition plate 32 includes a second hole 74 that aligns with the first hole 72 in the proximal sloping portion 40. When the holes 72 and 74 are aligned, the nut and bolt fastener can be inserted and connected in a conventional manner to couple the extension section 24 to the first transition plate 32.

While the fastening device 70 of the illustrated embodiment is a nut and bolt fastener, it should be appreciated that other removable fastening devices are within the scope of the present disclosure. As non-limiting examples, suitable removable fastening devices may include clamps, pressure sensitive fasteners, and straps. In other embodiments, the interface between the extension section and the first transition plate and/or the ramp platform may be a removable interference fit, such that no fastening device is required. Further, it should be appreciated that multiple fastening devices or a combination of different fastening devices may be employed to secure the extension section in the ramp assembly. It should further be appreciated that non-removable fastening or coupling devices or means are also within the scope of the present disclosure. As non-limiting examples, suitable non-removable fastening means include adhesive, welding, rivets, and integrated construction.

As best seen in FIG. 3, the distal sloping portion 42 may include a third hole 76, if desired. The third hole 76 can be used to receive a fastener to secure the extension section 24 to a lower or upper elevation surface L or U, for example, when in use, to prevent the ramp assembly 20 from slipping on a lower or upper elevation surface L or U.

Referring to FIGS. 1 and 3, the proximal and distal sloping portions 40 and 42 of the extension section 24 will now be described in greater detail. When attached to the ramp platform 22, the tread surface 48 of the proximal sloping portion 40 extends outwardly from the end 26 of the ramp platform 22 at an angle 80 with respect to the tread surface 30 of the ramp platform 22. The tread surface 50 of the distal sloping portion 42 extends outwardly from the proximal sloping portion 40 at an angle 82 with respect to the tread surface 48 of the proximal sloping portion 40. At their juncture 44, the tread surfaces 48 and 50 of the proximal and distal sloping portions 40 and 42 form an obtuse angle 46 therebetween. It should be appreciated that the obtuse angle 46 may be in the range of between about 91 and about 179 degrees. In the illustrated embodiment, the obtuse angle 46 is about 160 degrees. As another non-limiting example, the obtuse angle 46 may be in the range of about 150 to about 170 degrees. As yet another non-limiting example, the obtuse angle 46 may be in the range of about 145 to about 175 degrees.

The angular orientation of the tread surface 48 proximal sloping portion 40 may be the same as or different than the angular orientation of the tread surface 30 of the ramp platform 22. Because the proximal sloping portion 40 interfaces with the first transition plate 32, the tread surface 48 of the proximal sloping portion 40 and the tread surface 36 of the first transition plate 32 also may have the same or substantially similar angular orientations. As best seen in FIG. 3, the angular orientation of the tread surface 48 of the proximal sloping portion 40 in the illustrated embodiment is different from the angular orientation of the tread surface 30 of the ramp platform 22. In one embodiment, the angular orientation is rotated in a range of about 10 to about 30 degrees in the clockwise direction from the angular orientation of the tread surface 30 of the ramp platform 22. In another embodiment, the angular orientation is rotated less than about 30 degrees in the clockwise direction from the angular orientation of the tread surface 30 of the ramp platform 22. In yet another embodiment, the angular orientation is rotated less than about 20 degrees in the clockwise direction from the angular orientation of the tread surface 30 of the ramp platform 22.

The angular orientation of the tread surface 50 of the distal sloping portion 42 is relative to the angular orientation of the tread surface 48 of the proximal sloping portion 40. As best seen in FIG. 3, the angular orientation of the tread surface 50 of the distal sloping portion 42 in the illustrated embodiment is rotated in a range of about 10 to about 30 degrees in the clockwise direction from the angular orientation of the tread surface 48 of the proximal sloping portion 40. In another embodiment, the angular orientation is rotated less than about 30 degrees in the clockwise direction from the angular orientation of the tread surface 48 of the proximal sloping portion 40. In another embodiment, the angular orientation is rotated less than about 20 degrees in the clockwise direction from the angular orientation of the tread surface 48 of the proximal sloping portion 40.

It should be appreciated that the angular orientation of the tread surfaces 48 and 50 of the proximal and distal sloping portions 40 and 42, respectively, aid in overcoming a lip, door jam, molding, or other obstruction O that may affect the resting contacts and/or the transition between the ramp platform 22 and, for example, a lower or upper elevation surface L or U. However, the angular orientations of the tread surfaces 48 and 50, their relativity to one another, and their relativity to the angular orientation of the tread surface 30 of the ramp platform 22 are dependent on several factors, including but not limited to, the respective lengths of the proximal and distal sloping portions 40 and 42 and the obstruction O that the extension section 24 is designed to overcome.

As mentioned above, like the tread surface 30 of the ramp platform 22, the tread surfaces 48 and 50 of the proximal and distal sloping portions 40 and 42 and the tread surfaces 36 and 38 of the first and second transition plates 32 and 34 are all substantially planar tread surfaces. However, it should be appreciated that substantially planar tread surfaces having traction surfaces, such as non-skid material and/or ridges, as seen in the illustrated embodiments, or without traction surfaces, are within the scope of the present disclosure.

The ramp assembly 20 described herein can be made from any rigid material known and used in the art. As a non-limiting example, the ramp assembly 22, including the extension section 24, is made of lightweight aluminum. However, lightweight aluminum, as well as other construction materials, can be susceptible to bending or fatigue when under load. Therefore, in the illustrated embodiment, the extension section 24 may include one or more reinforcement bars or devices 84 extending between the lower surfaces of the proximal and distal sloping portions 40 and 42. The reinforcement devices 84 provide reinforcement to the extension section 24 to prevent bending along the juncture 44 between the proximal sloping portion 40 and the distal sloping portion 42.

Attachment of the extension section 24 to the ramp assembly 20 will now be described with reference to FIGS. 3 and 4. When an extension section 24 is obtained, the lip 62 of the extension section 24 can be inserted in the lip receiving channel 64, optionally using the lip alignment device 66 to guide the lip 62 in the lip receiving channel 64. After the lip 62 is received in the lip receiving channel 64, the extension section 24 can be rotated, as shown by arrow 86 in FIG. 4, such that the extension section 24 moves toward the first transition plate 32. As the extension section 24 is rotated into place, the rounded outer corner 58 of the extension section 24 interfaces with the rounded underside 60 of the transition plate 32, the stepped surface 56 of the proximal sloping portion 40 receives and interfaces with the transition plate 32, and the first and second holes 72 and 74 align. A fastening device 70 can be inserted through the aligned holes to couple the extension section 24 and first transition plate 32 together. The extension section 24 can be detached from the ramp platform 22 by a reverse process.

Now referring to FIGS. 5 and 6, ramp assemblies including extension sections constructed in accordance with other embodiments of the present disclosure will be described in greater detail. It should be appreciated that the following assemblies are substantially identical in materials and operation as the previously described embodiment, except for difference regarding the coupling of the extension section to the ramp platform (see FIG. 5) and the tread surfaces of the extension section (see FIG. 6), respectively. For clarity in the ensuing descriptions, numeral references of like elements of the ramp assembly 20 are similar, but are in the 100 series for the illustrated embodiment of FIG. 5, and in the 200 series for the illustrated embodiment of FIG. 6.

Figure 5:
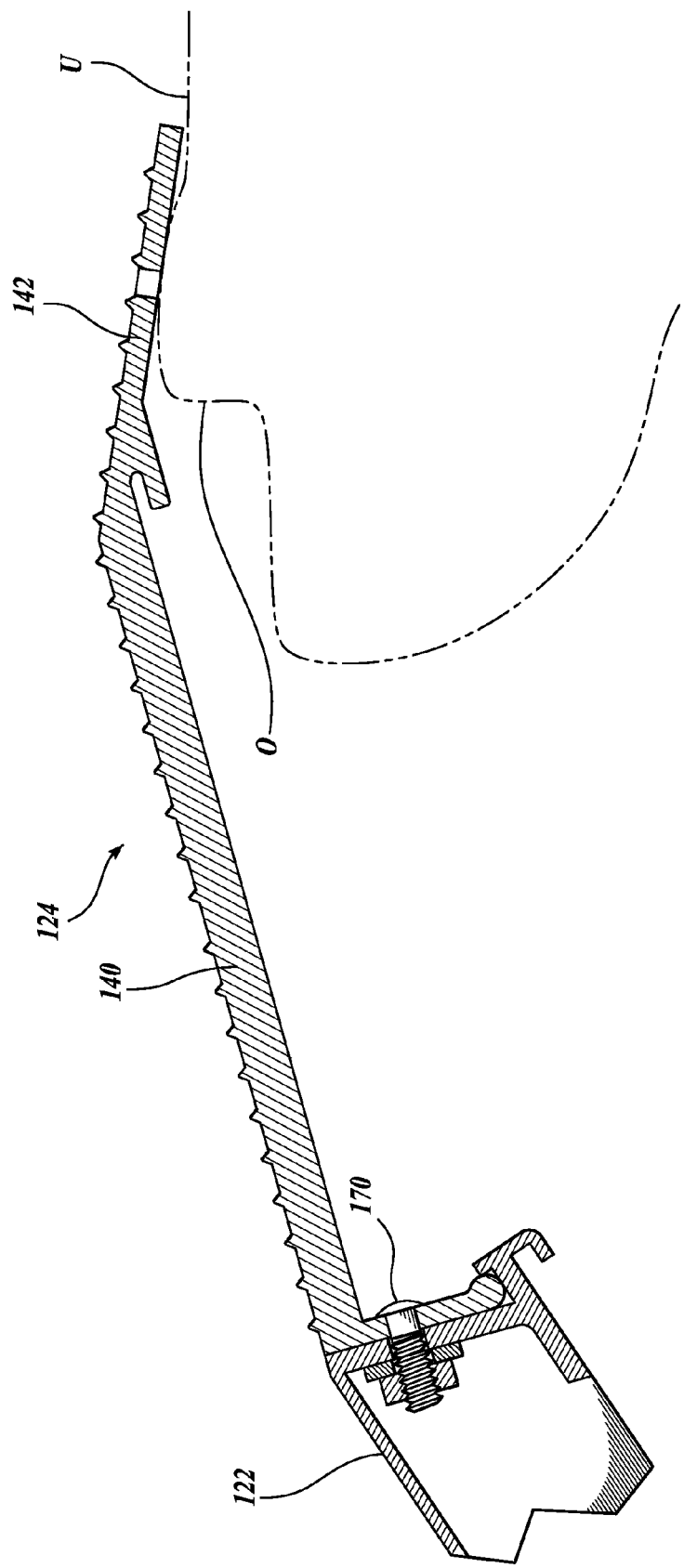
FIGS. 5 and 6 are partial cross-sectional side views of exemplary embodiments of a ramp assembly having extension sections formed according to various aspects of the present disclosure.

While in the illustrated embodiment of FIGS. 1-4, the extension section 24 is seen as a removable extension section coupled to the first transition plate 32 and the ramp platform 22, it should be appreciated that in other embodiments of the ramp assembly 120 the ramp platform 122 may be formed without having a first transition plate, and as such, the extension section 124 is designed and configured to couple directly to the end of the ramp platform 122 via fastener 170, as shown in FIG. 5. As described above with respect to the previous embodiment, other fastening devices, whether of the removable type or non-removable type may be employed to secure the extension section 124 in the ramp assembly 120.

Figure 6:
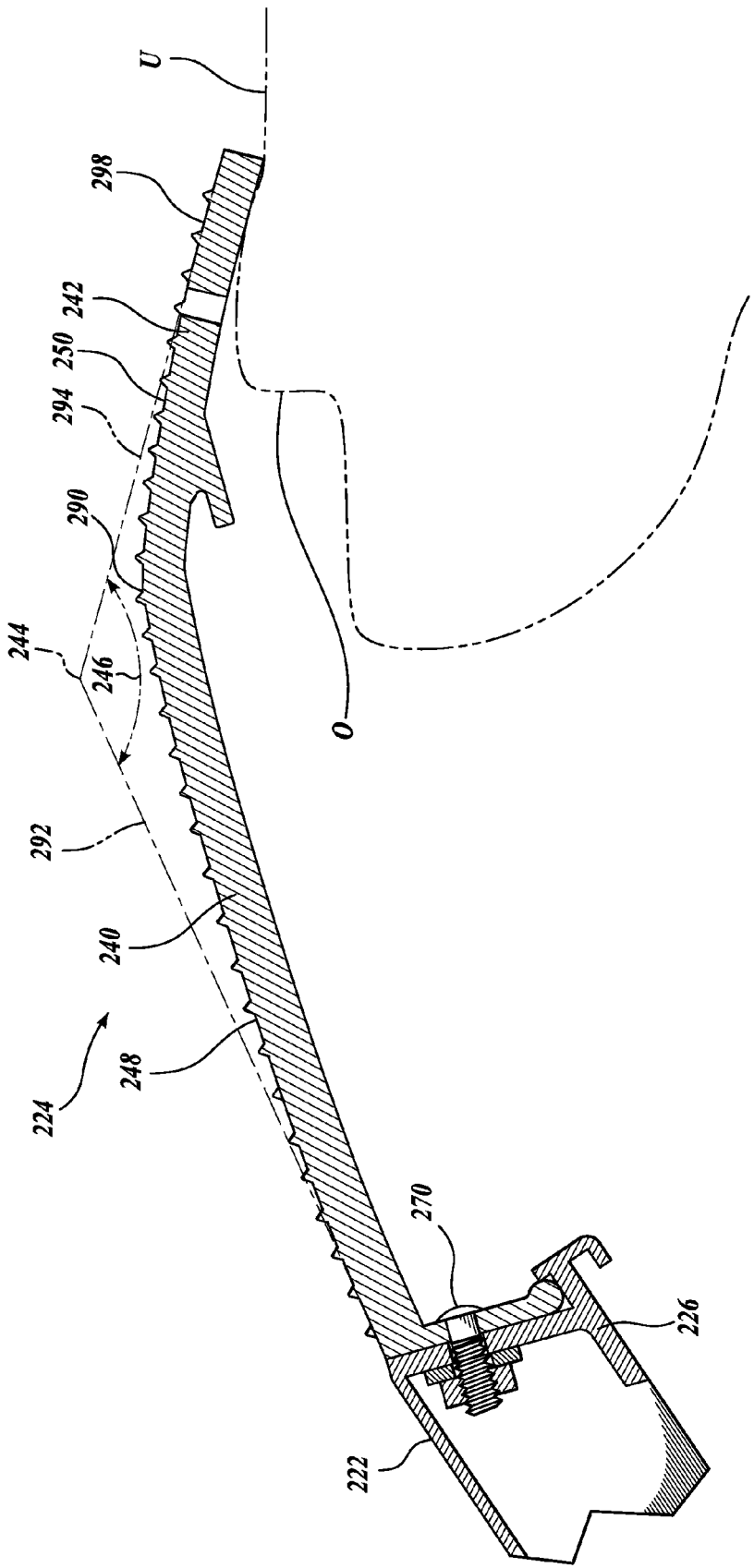

While in the illustrated embodiment of FIGS. 1-4, the proximal and distal sloping portions 40 and 42 of the extension section 24 are seen as having substantially planar tread surfaces 48 and 50, it should be appreciated that the sloping portions may have non-planar (e.g., curved, curvilinear, arcuate, etc.) tread surfaces, as one non-limiting example is shown in FIG. 6. In the illustrated embodiment of FIG. 6, the tread surface 248 of the proximal sloping portion 240 of the extension section 224 is generally an upwardly sloping portion extending outwardly from the end 226 of the ramp platform 222. The tread surface 250 of the distal sloping portion 242 is generally a downwardly sloping portion having a downward slope relative to the slope of the tread surface 248 of the proximal sloping portion 240. The upward and downward slopes, respectively, of the tread surfaces 248 and 250 of the proximal and distal sloping portions 240 and 242 meet at a crest 290, where the slope of the tread surface of the extension section 224 transitions from having an upward slope to having a downward slope.

As seen in FIG. 6, imaginary planes 292 and 294 can be drawn tangentially from first and second ends or end regions 296 and 298 of the tread surface of the extension section 224. These planes 292 and 294 converge at a juncture 244 forming an obtuse angle 246 therebetween.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While illustrative embodiments have been illustrated and described, it will be appreciated that various changes can be made therein without departing from the spirit and scope of the invention.

The embodiments of the invention in which an exclusive property or privilege is claimed are defined as follows:

1. An extension section for a ramp platform the ramp platform having a top substantially planar tread surface, a transition plate extending from the tread surface at an end of the ramp platform, wherein the transition plate extends at an angle relative to the orientation of the tread surface, and a lip receiving channel, the extension section comprising:

(a) a first sloping portion including a lip that is releasably receivable by a lip receiving channel, wherein the first sloping portion includes a stepped surface configured to interface with the transition plate and to extend at substantially the same angle as the transition plate relative to the orientation of the tread surface; and (b) a second sloping portion oriented with respect to the first sloping portion such that the first and second sloping portions converge to form an obtuse angle at their juncture.

2. The extension section of claim 1, wherein the obtuse angle is in the range of about 150 to about 170 degrees.

3. The extension section of claim 1, wherein the obtuse angle is about 160 degrees.

4. The extension section of claim 1, further comprising a fastening device for releasably fastening the extension section to a ramp platform.

\* \* \* \* \*

UNITED STATES PATENT AND TRADEMARK OFFICE
CERTIFICATE OF CORRECTION

PATENT NO.         : 8,191,193 B2                                    Page 1 of 1
APPLICATION NO.    : 13/118306
DATED              : June 5, 2012
INVENTOR(S)        : D. A. Bailie et al.

It is certified that error appears in the above-identified patent and that said Letters Patent is hereby corrected as shown below:

On the Title Page, Item (57) Abstract, Column 2, line 2
"a lip releasably that is receivable" should read "a lip that is releasably receivable"

In the Claims
Column 7, Line 3 (Claim 1, line 1)
after "section for a ramp platform" please insert --,--

Signed and Sealed this
Fifteenth Day of April, 2014

Michelle K. Lee
*Deputy Director of the United States Patent and Trademark Office*